United States Patent
Hamaoka et al.

(10) Patent No.: US 11,476,538 B2
(45) Date of Patent: Oct. 18, 2022

(54) PRESSURE CONTROL VALVE STRUCTURE AND POWER STORAGE MODULE

(71) Applicant: KABUSHIKI KAISHA TOYOTA JIDOSHOKKI, Kariya (JP)

(72) Inventors: Satoshi Hamaoka, Aichi-ken (JP); Taku Inoue, Aichi-ken (JP); Hiromi Ueda, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 16/953,530

(22) Filed: Nov. 20, 2020

(65) Prior Publication Data
US 2021/0159570 A1 May 27, 2021

(30) Foreign Application Priority Data

Nov. 26, 2019 (JP) .............................. JP2019-213038

(51) Int. Cl.
*H01M 50/325* (2021.01)
*H01G 11/78* (2013.01)

(52) U.S. Cl.
CPC .......... *H01M 50/325* (2021.01); *H01G 11/78* (2013.01)

(58) Field of Classification Search
CPC ........ H01G 11/08; H01G 11/14; H01G 11/20; H01G 11/78; H01G 11/82; H01M 10/0418; H01M 10/613; H01M 10/625; H01M 10/647; H01M 10/6561; H01M 2220/20; H01M 50/103; H01M 50/138; H01M 50/209; H01M 50/249; H01M 50/264; H01M 50/325; H01M 50/394; Y02E 60/10; Y02T 10/70
See application file for complete search history.

(56) References Cited

U.S. PATENT DOCUMENTS

2020/0067044 A1  2/2020  Hamaoka et al.

FOREIGN PATENT DOCUMENTS

| CN | 207422613 U | 5/2018 | |
|---|---|---|---|
| HK | 2019-061850 A | 4/2019 | |
| IN | 201917034499 A | 10/2019 | |
| JP | 2019133756 A | 8/2019 | |
| WO | WO-2018159456 A1 * | 9/2018 | ............. H01G 11/12 |

OTHER PUBLICATIONS

Office Action dated Aug. 16, 2021 in Indian Application No. 202014049732.

* cited by examiner

*Primary Examiner* — Victoria H Lynch
(74) *Attorney, Agent, or Firm* — Sughrue Mion, PLLC

(57) ABSTRACT

A pressure control valve structure includes a wall portion having a plurality of communication holes communicating with the internal space, a plurality of tubular portions surrounding the communication holes and extending outwardly from a wall surface of the wall portion as a proximal end, an elastic valve body disposed in each of the tubular portions and having a first end surface and a second surface opposite from the first surface, an outer peripheral wall surrounding the plurality of tubular portions collectively, and a cover fixed to the outer peripheral wall. The tubular portions are spaced from the cover. The tubular portions has an inner wall surface that includes an inclined surface that is inclined downwardly in a gravity direction from the proximal end of the tubular portion to a distal end of the tubular portion with a compression direction of the elastic valve body set extending horizontally.

6 Claims, 10 Drawing Sheets

PRESSURE CONTROL VALVE STRUCTURE AND POWER STORAGE MODULE

CROSS-REFERENCE TO RELATED APPLICATION

This application claims priority to Japanese Patent Application No. 2019-213038 filed on Nov. 26, 2019, the entire disclosure of which is incorporated herein by reference.

The present invention relates to a pressure control valve structure and a power storage module.

BACKGROUND ART

A power storage module disclosed in Japanese Patent Application Publication No. 2019-61850 has been known. This power storage module is provided with a pressure control valve for adjusting the pressure (internal pressure) of a plurality of internal spaces of the power storage module. The internal pressure of each of the internal spaces may be increased by the generation of gas in each of the internal space. The pressure control valve includes a plurality of elastic valve bodies for closing a plurality of opening (communication holes), each communicating with each of the internal spaces. The elastic valve bodies are accommodated in a case in which one ends of the openings are formed with the elastic valve bodies pressed by a cover member (lid) fixed to the case. Each of the elastic valve bodies pressed by the cover member closes the one end of each opening in an elastically deformed state. Of the plurality of internal spaces, in the internal space in which the internal pressure increases to a set pressure or greater, the elastic valve body is deformed by the pressure of the gas from the opening of the internal space, and the gas in the internal space may be discharged from the opening thereof.

In adjusting the pressure in the plurality of internal spaces of the power storage module, an electrolyte in each internal space together with gas generated in the internal space may be discharged through its associated communication hole. In this case, electrolytes discharged from different communication holes may contact each other, which may result in short circuit between electrodes disposed in the different internal spaces through the electrolytes.

The present disclosure is directed to providing a pressure control valve structure and a power storage module capable of suppressing short circuit caused by the discharged electrolyte.

SUMMARY

In accordance with an aspect of the present disclosure, there is provided a pressure control valve structure used for a power storage module including a plurality of cells having an internal space in which a positive electrode, a negative electrode, a separator, and an electrolyte are disposed. The pressure control valve structure includes a wall portion having a plurality of communication holes, each of the communication holes communicating with the internal space, a plurality of tubular portions surrounding their associated communication holes and protruding outwardly from a wall surface of the wall portion as a proximal end, a plurality of elastic valve bodies, each of the elastic valve bodies accommodated in each of the tubular portions and having a first end surface and a second surface opposite from the first end surface, the first end surface closing each of the communication hole, an outer peripheral wall surrounding the plurality of tubular portions collectively, and a cover fixed to the outer peripheral wall and pressing the second end surface of each of the elastic valve bodies towards the wall portion. The tubular portions are spaced from the cover. Each of the tubular portions has an inner wall surface that includes an inclined surface that is inclined downwardly in a gravity direction from the proximal end of the tubular portion to a distal end of the tubular portion with a compression direction of the elastic valve bodies set extending horizontally.

In accordance with another aspect of the present disclosure, there is provided with a power storage module including the pressure control valve structure.

Other aspects and advantages of the present disclosure will become apparent from the following description, taken in conjunction with the accompanying drawings, illustrating by way of example the principles of the present disclosure.

BRIEF DESCRIPTION OF DRAWINGS

The present disclosure together with objects and advantages thereof may best be understood by reference to the following description of the presently preferred embodiments together with the accompanying drawings in which.

DESCRIPTION OF EMBODIMENTS

Figure 1:
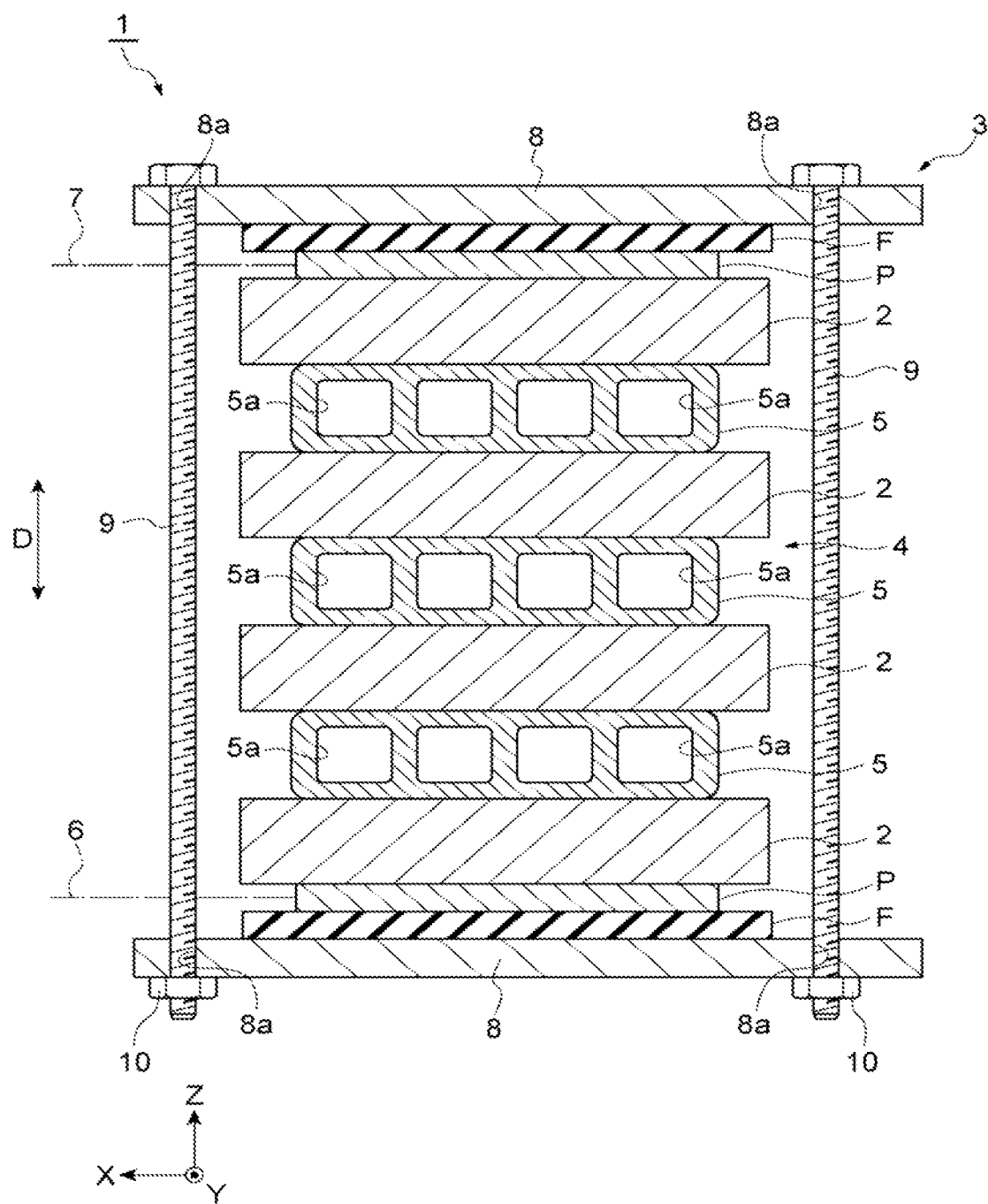
FIG. 1 is a schematic cross-sectional view illustrating a power storage device provided with an example of a power storage module.

The following will describe an embodiment of the present disclosure with reference to the accompanying drawings in detail. In the description of the drawings, the same reference numerals are used for the same or equivalent parts, and the repeated descriptions are omitted. In the drawings, an XYZ Cartesian coordinate system may be shown as required.

FIG. 1 is a schematic cross-sectional view illustrating an example of a power storage device including a power storage module according to the present embodiment. A power storage device 1 illustrated in FIG. 1 is used as a battery for various vehicles such as a forklift truck, a hybrid vehicle, and an electric vehicle. The power storage device 1 includes a module stack 4 in which a plurality of power storage modules 2 are stacked, and a constraining member 3 that applies a constraint load to the module stack 4 in the stacking direction D of the module stack 4.

The module stack 4 includes the plurality of power storage modules 2 (four power storage modules 2 illustrated in the drawing), and a plurality of conductive plates 5 (three conductive plates 5 illustrated in the drawing). The power storage modules 2 each are a bipolar battery, and have a rectangular shape as viewed from the stacking direction D.

The power storage modules 2 each are, for example, a secondary battery such as a nickel-hydrogen secondary battery and a lithium ion secondary battery, or an electric double layer capacitor. In the following description, a nickel-hydrogen secondary battery will be described as an example.

Adjacent two of the power storage modules 2 in the stacking direction D are electrically connected in series through one of the conductive plates 5. Conductive plates P electrically connected to the power storage modules 2 and insulating plates F are stacked in this order on the both ends of the module stack 4 in the stacking direction D. A positive terminal 6 is connected to one of the conductive plates P, and a negative terminal 7 is connected to the other of the conductive plates P. The positive terminal 6 and the negative terminal 7 are drawn out, for example, from the edge portions of the conductive plates P in the direction intersecting the stacking direction D. Charging and discharging of the power storage device 1 is performed through the positive terminal 6 and the negative terminal 7.

The conductive plate 5 disposed between the power storage modules 2 has therein a plurality flow paths 5a through which cooling medium such as air is circulated. The flow paths 5a extend, for example, along the stacking direction D and a drawn direction in which the positive terminal 6 and the negative terminal 7 are drawn, the stacking direction D and the drawn direction intersecting with each other (perpendicular to each other). The conductive plate 5 serves as a connecting member that electrically connects the power storage modules 2 to each other. Further, the conductive plate 5 also serves as a heat sink that dissipates heat generated in the power storage module 2 with the cooling medium circulated through these flow paths 5a. Although the area of the conductive plate 5 is smaller than the area of the power storage module 2 as viewed from the stacking direction D in an example illustrated in FIG. 1, the area of the conductive plate 5 may be the same as the area of the power storage module 2, or may be larger than the area of the power storage module 2 for improving the heat dissipation performance.

The constraining member 3 includes a pair of end plates 8 between which the module stack 4 is sandwiched in the stacking direction D, fastening bolts 9 and nuts 10 that fasten the end plates 8 to each other. The end plates 8 each are a rectangular metal plate having an area greater than the areas of the power storage module 2, the conductive plate 5, and the conductive plate P as viewed from the stacking direction D. The insulating plate F having an electrically insulating property is provided between the end plate 8 and the conductive plate P, so that the end plate 8 and the conductive plate P are insulated by the insulating plate F.

Insertion holes 8a are formed in edge portions of each of the end plates 8 at positions outward of the module stack 4 as viewed from the stacking direction D. The fastening bolt 9 is inserted from the insertion hole 8a of one of the end plates 8 towards the insertion hole 8a of the other of the end plates 8. The nut 10 is screwed into the distal end portion of the fastening bolt 9 protruding from the insertion hole 8a of the other of the end plates 8. In this way, the power storage module 2, the conductive plate 5, and the conductive plate P are held between the end plates 8, which forms a unit corresponding to the module stack 4. Further, constraint load is applied to the module stack 4 in the stacking direction D.

Figure 2:
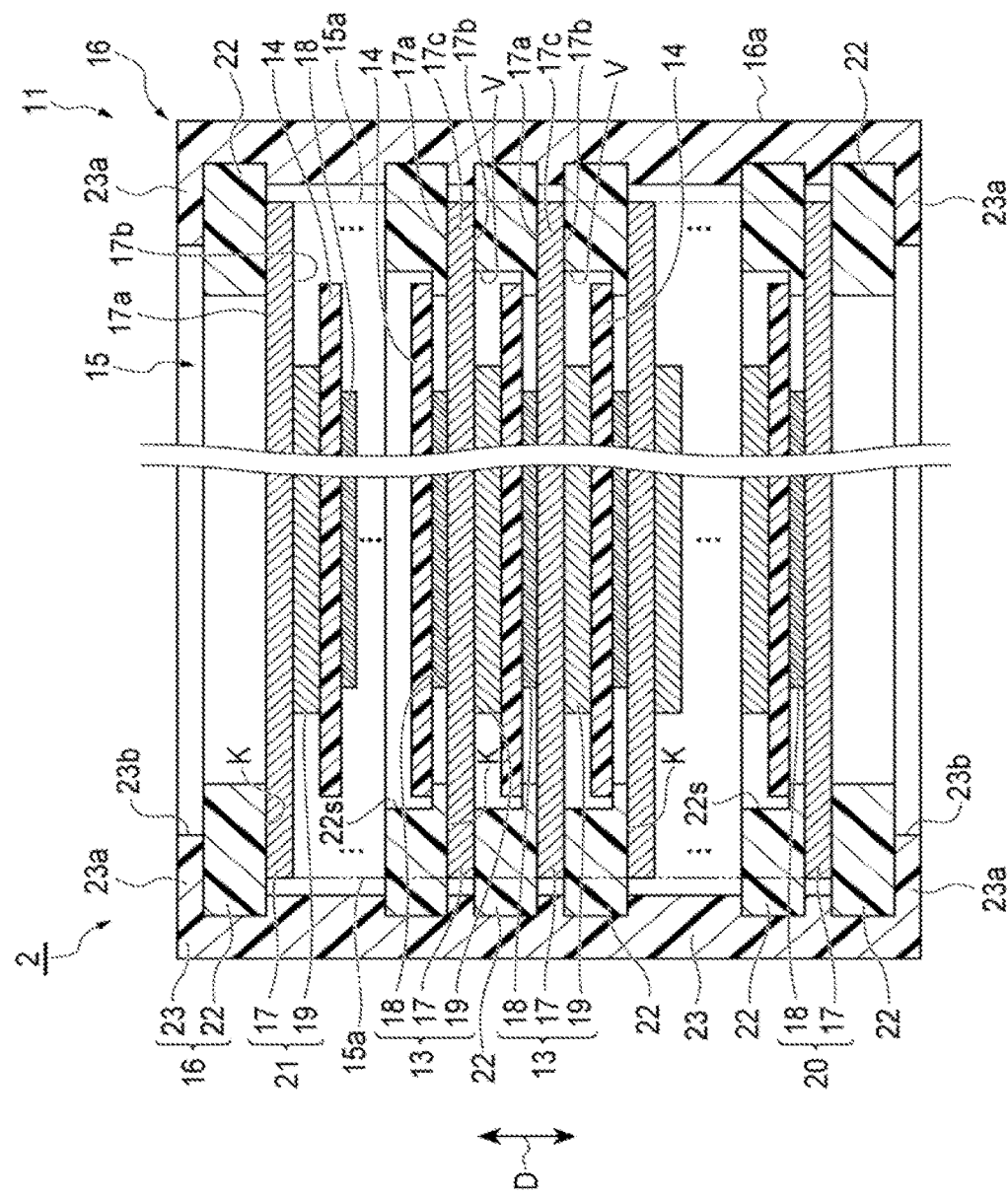
FIG. 2 is a schematic cross-sectional view illustrating the example of the power storage module.
Figure 3:
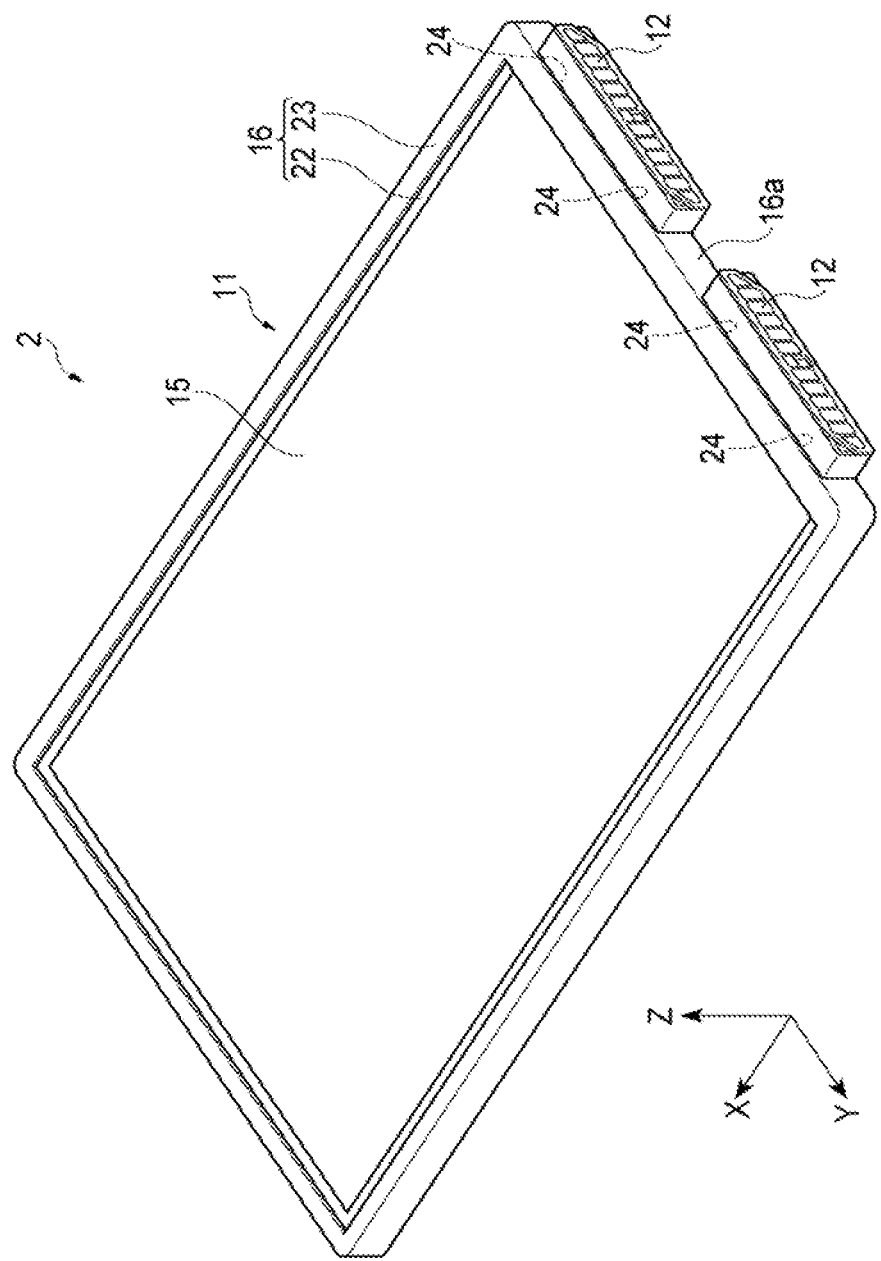
FIG. 3 is a schematic perspective view illustrating the example of the power storage module.

Next, the configuration of the power storage module 2 will be described in detail. FIG. 2 is a schematic cross-sectional view illustrating an internal configuration of the power storage module. FIG. 3 is a schematic perspective view of the power storage module. In FIGS. 2 and 3, the power storage module 2 has a structure (multiple cell structure) in which a plurality of cells (e.g., twenty four cells) are stacked in the stacking direction D. It is noted that a "cell" corresponds to a minimum unit constituting a battery, and has an internal space in which a positive electrode, a negative electrode, a separator, and an electrolyte are accommodated. In one example, one cell includes one positive electrode, one negative electrode, a separator disposed between the positive electrode and the negative electrode, and an electrolyte that are disposed in the internal space, but one cell may include, for example, a plurality of positive electrodes, a plurality of negative electrodes, a plurality of separators, and an electrolyte that are accommodated in the internal space.

The power storage module 2 includes a module main body 11 and a plurality of pressure control valve 12 (four pressure control valves 12 in the present embodiment) fixed to the module main body 11. The module main body 11 includes an electrode stack 15 and a frame 16 that is disposed so as to surround the electrode stack 15. The electrode stack 15 includes a plurality of electrodes stacked with separators 14 disposed therebetween along the stacking direction D of the power storage module 2. The plurality of electrodes includes a plurality of bipolar electrodes 13, a negative terminal electrode 21, and a positive terminal electrode 20.

The bipolar electrodes 13 each include an electrode plate 17 having one surface 17a and the other surface 17b on the opposite side of the electrode plate 17 from the one surface 17a, a positive electrode active material layer 18 provided on the one surface 17a, and a negative electrode active material layer 19 provided on the other surface 17b. The electrode plate 17 is coated with a positive electrode slurry containing a positive electrode active material to form the positive electrode active material layer 18. For example, nickel hydroxide is used as the positive electrode active material. The electrode plate 17 is coated with a negative electrode slurry containing a negative electrode active material to form the negative electrode active material layer 19. For example, hydrogen storage alloy is used as the negative electrode active material.

In the present embodiment, a region where the negative electrode active material layer 19 is formed on the other surface 17b of the electrode plate 17 is greater than a region where the positive electrode active material layer 18 is formed on the one surface 17a of the electrode plate 17. In the electrode stack 15, the positive electrode active material layer 18 of one bipolar electrode 13 faces the negative electrode active material layer 19 of another bipolar electrode 13 that is disposed adjacently to the one bipolar electrode 13 on one side thereof in the stacking direction D with the separator 14 disposed therebetween. In the electrode stack 15, the negative electrode active material layer 19 of one bipolar electrode 13 faces the positive electrode active material layer 18 of another bipolar electrode 13 that is disposed adjacently to the one bipolar electrode 13 on the other side thereof in the stacking direction D with the separator 14 interposed therebetween.

The negative terminal electrode 21 includes the electrode plate 17 and the negative electrode active material layer 19 provided on the other surface 17b of the electrode plate 17. The negative terminal electrode 21 is disposed at one end of the electrode stack 15 in the stacking direction D so that the other surface 17b faces the center of the electrode stack 15 in the stacking direction D. The one surface 17a of the electrode plate 17 of the negative terminal electrode 21 forms an outer surface of the electrode stack 15 on one side in the stacking direction D, and is electrically connected to the conductive plate 5 or the conductive plate P (FIG. 1) that is disposed adjacently to the power storage module 2 on the one side. The negative electrode active material layer 19 formed on the other surface 17b of the electrode plate 17 of the negative terminal electrode 21 faces the positive electrode active material layer 18 of the bipolar electrode 13 disposed at the one end of the electrode stack 15 in the stacking direction D with the separator 14 disposed therebetween.

The positive terminal electrode 20 includes the electrode plate 17 and the positive electrode active material layer 18 formed on the one surface 17a of the electrode plate 17. The positive terminal electrode 20 is disposed at the other end of the electrode stack 15 in the stacking direction D so that the one surface 17a faces the center of the electrode stack 15 in the stacking direction D. The other surface 17b of the electrode plate 17 of the positive terminal electrode 20 forms an outer surface of the electrode stack 15 on the other side in the stacking direction D, and is electrically connected to the conductive plate 5 or the conductive plate P (FIG. 1) that is disposed adjacently to the power storage module 2 on the other side. The positive electrode active material layer 18 formed on the one surface 17a of the positive terminal electrode 20 faces the negative electrode active material layer 19 of the bipolar electrode 13 disposed at the other end of the electrode stack 15 in the stacking direction D with the separator 14 disposed therebetween.

The electrode plate 17 is a conductor having a plate shape extending in the horizontal direction, and has flexibility. Thus, the horizontal direction corresponds to the extending direction of the electrode plate 17. The electrode plate 17 is provided by, for example, a nickel foil, a plated steel plate, or a plated stainless steel plate. An example of the steel plate is a cold reduced carbon steel sheet (SPCC, or the like) as defined in JIS G 3141:2005. An example of the stainless steel plate is a SUS304, or the like, as defined in JIS G 4305:2015. The thickness of the electrode plate 17 is, for example, 0.1 μm to 1000 μm or less. When the electrode plate 17 is provided by a nickel foil, the nickel foil may be plated. The electrode plate 17 has an edge portion 17c (the edge portion of the bipolar electrode 13) that has a rectangular frame shape, and the edge portion 17c is a part which is not coated with the positive electrode slurry or the negative electrode slurry.

The separator 14 has, for example, a sheet shape. For example, a porous film made of a polyolefin-based resin such as polyethylene (PE) and polypropylene (PP), a woven fabric or a nonwoven fabric made of polypropylene, methylcellulose, or the like, and the like may be used for the separator 14. The separator 14 may be reinforced with a vinylidene fluoride resin compound.

The frame 16 has a rectangular frame shape as a whole, and is made of, for example, an insulating resin. The frame 16 is disposed so as to surround the edge portions 17c of the electrode plates 17 and also to surround the side surface 15a of the electrode stack 15. The frame 16 holds the edge portions 17c. The frame 16 includes a plurality of first sealing portions 22 connected to the edge portions 17c of the electrode plates 17, and a second sealing portion 23 extending along the stacking direction D and connected to the first sealing portions 22. The first sealing portions 22 and the second sealing portion 23 are made of insulating resin having alkali resistance. As a material for the first sealing portions 22 and the second sealing portion 23, for example, polypropylene (PP), polyphenylene sulfide (PPS), modified polyphenylene ether (modified PPE), and the like may be used.

The first sealing portion 22 is provided continuously over the entire circumference of the edge portion 17c on the one surface 17a of the electrode plate 17, and has a rectangular frame shape as viewed from the stacking direction D. In the present embodiment, the first sealing portion 22 is provided not only for the electrode plate 17 of the bipolar electrode 13, but also for the electrode plate 17 of the negative terminal electrode 21 and the electrode plate 17 of the positive terminal electrode 20. In the negative terminal electrode 21, the first sealing portion 22 is provided on the edge portion 17c of the one surface 17a of the electrode plate 17, and in the positive terminal electrode 20, the first sealing portion 22 is provided on the edge portion 17c of each of the one surface 17a and the other surface 17b of the electrode plate 17.

The first sealing portion 22 is disposed so as to overlap the edge portion 17c of the electrode plate 17 to form an overlapping portion K. The first sealing portion 22 is welded hermetically to the electrode plate 17 at the overlapping portion K, for example, by ultrasonic or thermocompression. The first sealing portion 22 is formed by using, for example, a film having a predetermined thickness in the stacking direction D. The inner part of the first sealing portion 22 is positioned between the edge portions 17c of the electrode plates 17 adjacent to each other in the stacking direction D (inward of the side surface 15a of the electrode stack 15). The outer part of the first sealing portion 22 extends outward of the edge of the electrode plate 17 (outward of the side surface 15a of the electrode stack 15) and such portion extending outward thereof is hold by the second sealing portion 23. The first sealing portions 22 adjacent to each other along the stacking direction D may be spaced apart from each other or in contact with each other. The outer edge portions of the first sealing portions 22 may be bonded to each other, for example, by heat plate welding.

In the electrode stack 15, a stepped portion 22s for placing an edge portion of the separator 14 is provided on the inner edge side of the first sealing portion 22 located in inner layers in the stacking direction D. The stepped portion 22s may be formed by folding an outer edge portion of the film forming the first sealing portion 22 inwardly. The stepped portion 22s may be formed by overlapping a film forming an upper layer with a film forming a lower layer.

The second sealing portion 23 is disposed outwards of the electrode stack and the first sealing portions 22, and forms an outer wall of the power storage module 2 (housing). The second sealing portion 23 is formed, for example, by injection molding of resin, and extends over the entire length of the electrode stack along the stacking direction D. The second sealing portion 23 has a rectangular frame shape extending in the stacking direction D as its axial direction. The second sealing portion 23 is welded to the outer edge portions of the first sealing portions 22, for example, by heat generated at the injection molding.

The second sealing portion 23 has overhang portions 23a on opposite ends in the stacking direction D. One of the overhang portions 23a extends towards the inner edge portion of the first sealing portion 22 at the one end of the power storage module 2 in the stacking direction D, and is fixed to the first sealing portion 22 that is welded to the one surface 17a of the electrode plate 17 forming the negative terminal electrode 21. The other of the overhang portions 23a extends towards the inner edge portion of the first sealing portion 22 at the other end of the power storage module 2 in the stacking direction D, and is fixed to the first sealing portion 22 that is welded to the other surface 17b of the electrode plate 17 forming the positive terminal electrode 20. The overhang lengths of the overhang portions 23a are equal to each other, and the ends 23b of these overhang portions 23a are positioned so as to overlap the overlapping portion K where the electrode plate 17 and the first sealing portion 22 overlap as viewed from the stacking direction D.

The first sealing portions 22 and the second sealing portion 23 cooperate to form internal spaces V between the adjacently disposed electrodes and to seal the internal spaces V. More specifically, the second sealing portion 23 and the first sealing portions 22 cooperate to seal between the bipolar electrodes 13 disposed adjacently to each other along the stacking direction D, between the negative terminal electrode 21 and the bipolar electrode 13 disposed adjacently to each other along the stacking direction D, and between the positive terminal electrode 20 and the bipolar electrode 13 disposed adjacently to each other along the stacking direction D, respectively. Thus, the internal spaces V are formed between the bipolar electrodes 13 disposed adjacently to each other, between the negative terminal electrode 21 and the bipolar electrode 13 disposed adjacently to each other, and between the positive terminal electrode 20 and the bipolar electrode 13 disposed adjacently to each other. The internal spaces V are hermetically partitioned. In the present embodiment, the internal space V corresponds to a space surrounded by the one surface 17a of the one electrode plate 17, the other surface 17b of another electrode plate 17 adjacent to the one electrode plate 17, and the first sealing portion 22. The internal space V is filled with the electrolyte.

That is, one cell includes one electrode plate 17, the positive electrode active material layer 18 formed on the one surface 17a of the one electrode plate 17, the negative electrode active material layer 19 formed on the other surface 17b of another electrode plate 17 disposed adjacently to the one electrode plate 17, the separator 14 disposed between the positive electrode active material layer 18 and the negative electrode active material layer 19, and the electrolyte. In other words, one cell has the internal space V between the adjacently disposed electrodes, which is sealed by the first sealing portion 22 and the second sealing portion 23. In the internal space V, the positive electrode active material layer 18 formed on the one surface 17a of the one electrode plate 17, the negative electrode active material layer 19 formed on the other surface 17b of another electrode plate 17 disposed adjacently to the one electrode plate 17, the separator 14 disposed between the positive electrode active material layer 18 and the negative electrode active material layer 19, and the electrolyte are accommodated. The electrolyte is an aqueous electrolyte containing an alkaline solution such as aqueous potassium hydroxide solution. The electrolyte is impregnated into the separator 14, the positive electrode active material layer 18, and the negative electrode active material layer 19. The power storage module 2 includes a plurality of internal spaces V arranged in order in the stacking direction D (twenty four internal spaces V in the illustrated example). That is, the power storage module 2 includes a plurality of cells arranged in the stacking direction D (twenty four cells in the illustrated example).

Figure 4:
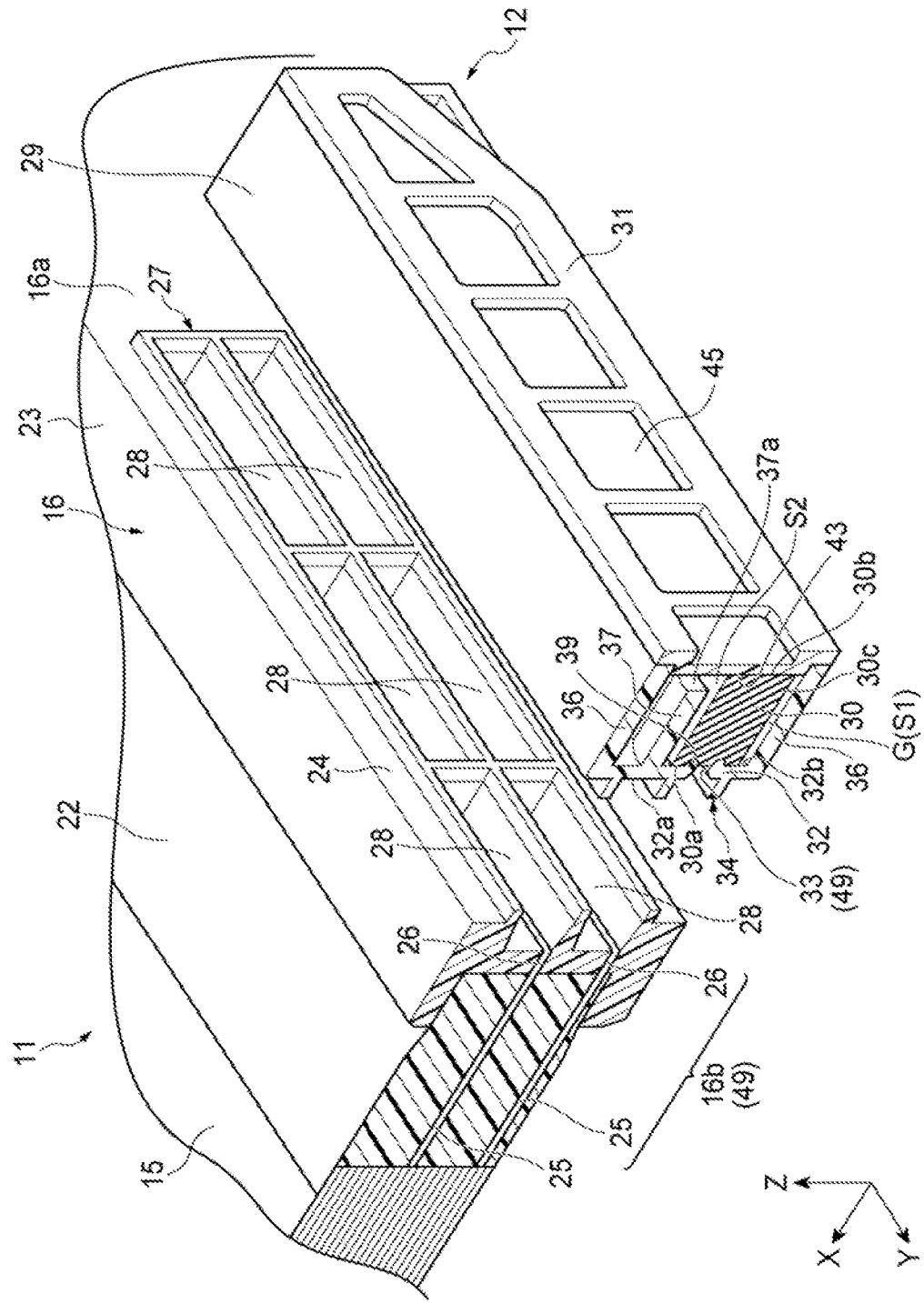
FIG. 4 is an exploded perspective view illustrating a part of the example of the power storage module.
Figure 5:
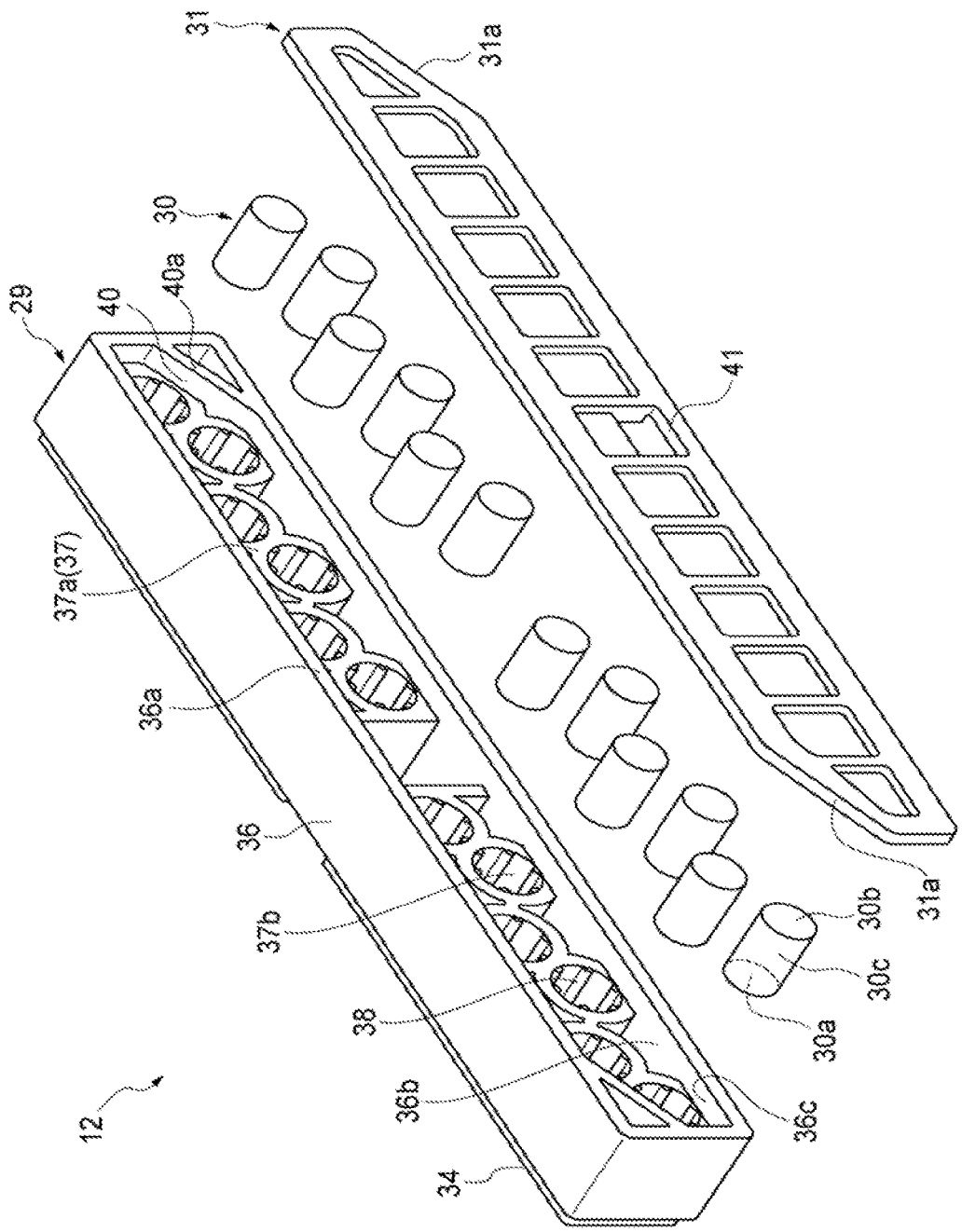
FIG. 5 is an exploded perspective view illustrating an example of a pressure control valve.
Figure 6:
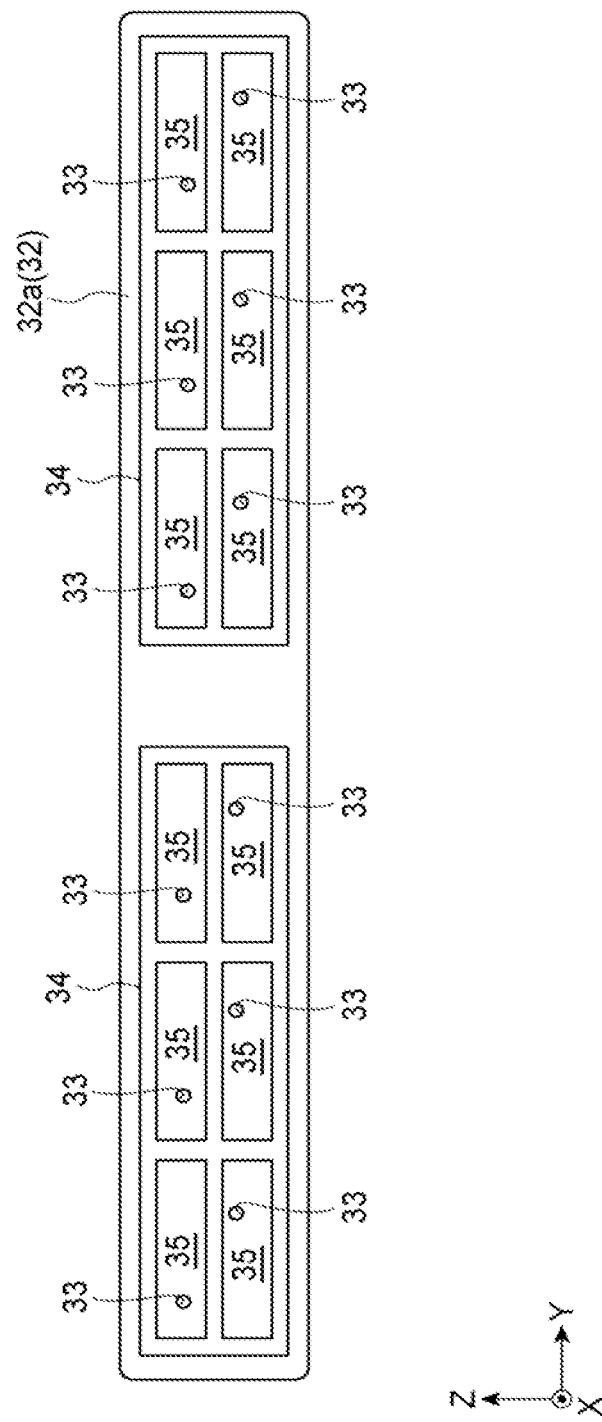
FIG. 6 is a bottom view illustrating the example of the pressure control valve.
Figure 7:
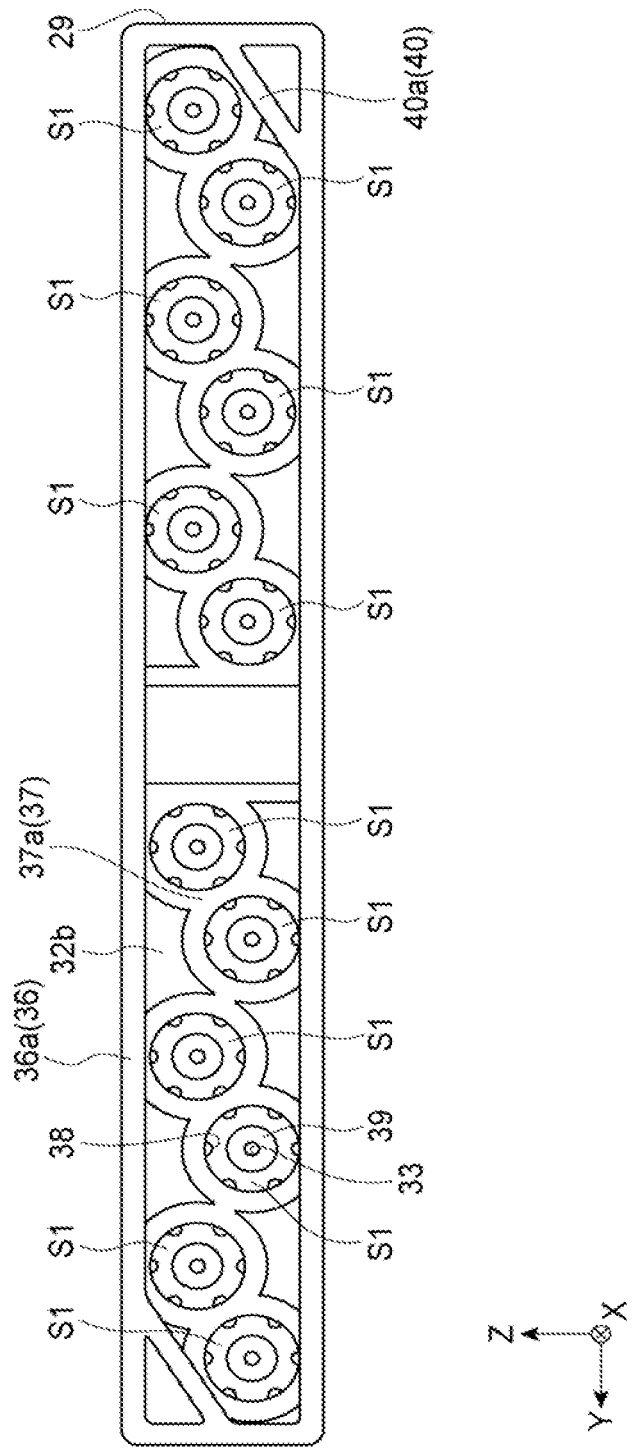
FIG. 7 is a plan view illustrating an example of a case.
Figure 8:
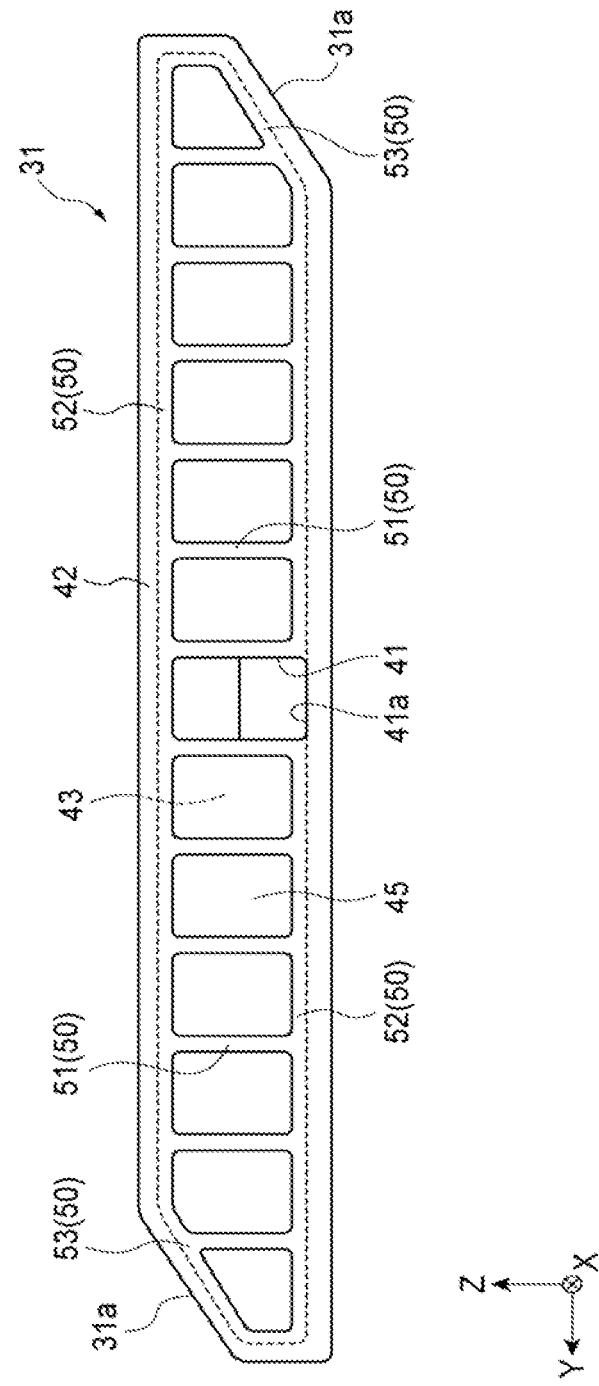
FIG. 8 is a plan view illustrating an example of a cover.

Referring further to FIGS. 4 to 8, the configuration of the pressure control valve 12, which corresponds to the pressure control valve structure of the present disclosure, will be described. FIG. 4 is an exploded perspective view illustrating a part of the power storage module of one example. FIG. 5 is an exploded perspective view illustrating a pressure control valve of one example. FIG. 6 is a bottom view of the pressure control valve of one example. FIG. 7 is a plan view of a case forming the pressure control valve. FIG. 8 is a plan view of a cover forming the pressure control valve.

As illustrated in FIGS. 3 and 4, a plurality of mounting areas 24 (four mounting areas in the present embodiment) for mounting the pressure control valve 12 are provided in one wall portion 16a forming the frame 16. In one example, one pressure control valve 12 is provided for two mounting areas 24 disposed side by side in the Y direction. The frame 16 has through holes 16b formed in the mounting areas 24 of the frame 16, extending through to the internal spaces V (FIG. 2). Each mounting area 24 is provided with a plurality of through holes 16b (six through holes in the present embodiment). The through holes 16b are arranged in two rows so that each row has three through holes 16b (three through holes in the Y direction, two through holes in the Z direction) in each mounting area 24. Thus, the through holes 16b are arranged in two rows so that each row has twelve through holes 16b in the wall portion 16a. Each through hole 16b communicates with its associated internal space V of the cell.

Each through hole 16b has a through hole 25 provided in the first sealing portion 22 and a through hole 26 provided in the second sealing portion 23. The through hole 16b functions as an inlet hole through which the electrolyte is injected into the internal space V. After the electrolyte is injected, the through hole 16b serves as a flow path through which gas (e.g., hydrogen gas) generated in the internal space V flows.

A connecting projection 27 having a substantially frame shape is formed in the outer surface of each mounting area 24 of the second sealing portion 23. The connecting projection 27 connects the module main body 11 to the pressure control valve 12, and the connecting projection 27 and the through hole 26 cooperate to form a plurality of flow paths 28 (six flow paths 28 illustrated in the drawing) through which gas from the internal spaces V flows. Thus, the flow paths 28 are arranged in two rows so that each row includes three flow paths 28 in each mounting area 24. The flow paths 28 each have a rectangular shape in a cross section along a plane perpendicular to the X direction. The connecting projection 27 has a lattice shape as viewed from the X direction.

As illustrated in FIGS. 4 and 5, the pressure control valve 12 includes a case 29, a plurality of valve bodies 30 (twelve valve bodies 30 illustrated in the drawing), and a cover 31. The case 29 is made of a resin such as PP, PPS, or modified PPE. The case 29 has a generally rectangular shape as viewed from the facing direction in which the case 29 faces the cover 31. The facing direction corresponds to a mounting direction in which the pressure control valve 12 is mounted to the module main body 11 (wall portion 16a), and also to a compressing direction of the valve body 30, which will be described later. The pressure control valve 12 is mounted to the module main body 11 in a direction perpendicular to the wall portion 16a. Thus, the facing direction coincides with the X direction.

The case 29 has a bottom wall portion 32 (wall portion). The bottom wall portion 32 has a plurality of through holes 33 (twelve through holes 33 illustrated in the drawing), which extends from an outer wall surface 32a of the bottom wall portion 32 on the module main body 11 side to an inner wall surface 32b (wall surface) of the bottom wall portion 32 on the cover 31 side in the facing direction. These through holes 33 are connected to their associated through holes 16b of the module main body 11 through a space. Thus, the through hole 33 and the through hole 16b cooperate to form a communication hole 49 communicating with the internal space V formed in the module main body 11. In other words, the through holes 33 and the through holes 16b form a portion of the communication hole 49. The through hole 33 corresponds to an outlet of the communication hole 49, and has a circular shape in cross section along a plane extending perpendicular to the X direction (Y-Z plane) (see FIG. 6).

As illustrated in FIG. 6, paired connecting projections 34 having a substantially frame shape are formed in the outer wall surface 32a of the bottom wall portion 32. The paired connecting projections 34 are spaced at an interval in the direction Y, which corresponds to the interval between the connecting projections 27. The paired connecting projections 34 connect the module main body 11 to the pressure control valve 12, and form a plurality of flow paths 35 (twelve flow paths 35 illustrated in the drawing) through which gas from the internal spaces V flows. The connecting projections 34 are connected to the connecting projections 27 of the module main body 11. The connecting projections 34 each have a shape and dimensions corresponding to each of the connecting projections 27. Thus, the flow paths 35 each have a rectangular shape in cross section along the plane (Y-Z plane) extending perpendicular to the X direction. Further, the connecting projections 34 each have a lattice shape as viewed from the X direction. The module main body 11 and the pressure control valve 12 are connected, for example, by hot plate welding. Specifically, a heated plate is placed between the module main body 11 and the pressure control valve 12 and then the ends of the connecting projections 27 and the connecting projections 34 are brought into contact with the heated plate, so that the ends of the connecting projections 27 and the connecting projections 34 are melted. Subsequently, the connecting projections 27 and 34 are welded (connected) by pressing the ends of the connecting projections 34 against the ends of the connecting projections 27 while the connecting projections 27 and the connecting projections 34 are melted. As a result, the module main body 11 and the pressure control valve 12 are connected.

As illustrated in FIGS. 4, 5 and 7, the case 29 has an outer peripheral wall portion 36 and partition wall portions (tubular portions) 37, both protruding from the bottom wall portion 32 towards the cover 31. In the present embodiment, the outer peripheral wall portion 36 and the partition wall portions 37 are formed integrally with the bottom wall portion 32. The outer peripheral wall portion 36 is formed standing from the edge portion of the inner wall surface 32b of the bottom wall portion 32 so that the outer peripheral wall portion 36 surrounds the plurality of valve bodies 30 (twelve valve bodies 30 illustrated in the drawing) collectively. Specifically, the outer peripheral wall portion 36 is formed extending over the entire periphery of the outer peripheral edge portion of the bottom wall portion 32 and forms the outer wall of the case 29. More specifically, the outer peripheral wall portion 36 is formed in a substantially rectangular frame shape along the outer peripheral edge portion of the bottom wall portion 32 as viewed from the facing direction.

The partition wall portions 37 each are formed standing from the inner wall surface 32b of the bottom wall portion 32 as its proximal end so as to cover a side surface 30c of each valve body 30. In one example, the partition wall portions 37 each form an accommodation space S1 of a substantially columnar shape (more accurately, a circular truncated cone shape), which accommodates one valve body 30. That is, the partition wall portions 37 each have a tubular shape having a substantially circular shape in cross section. It is noted that the partition wall portions 37 each need not necessarily have a tubular shape independently as long as the partition wall portions 37 each can form a substantially columnar space therein for accommodating an elastic valve body extending in the direction X. In the present embodiment, the partition wall portion 37 and a part of the outer peripheral wall portion 36 surround the side surface 30c of the valve body 30 to form the accommodation space S1. Further, in the present embodiment, one partition wall portion 37 in which one valve body 30 is accommodated and another partition wall portion 37 in which another valve body 30 disposed adjacently to the one valve body 30 is accommodated are formed integrally. In this way, the partition wall portions 37 accommodating therein different valve bodies 30 may have a shared portion. It is noted that the outer peripheral surfaces of the partition wall portions 37 may be spaced from each other, and may be spaced from the inner wall surface 36b of the outer peripheral wall portion 36.

In the present embodiment, with respect to the inner wall surface 32b of the bottom wall portion 32, the end surface 36a of the outer peripheral wall portion 36 on the cover 31 side is disposed at a position higher than the end surfaces 37a of the partition wall portions 37 on the cover 31 side in the facing direction. Thus, in a state where the cover 31 is fixed to the case 29, the cover 31 is in contact with the end surface 36a of the outer peripheral wall portion 36, but the cover 31 and the end surfaces 37a of the partition wall portions 37 are spaced from each other. Thus, a space S2 is formed between the cover 31 and the end surfaces 37a of the partition wall portions 37. The space S2 serves as a flow path of gas flowing into the inside of the pressure control valve 12 from the internal spaces V.

The valve body 30 (elastic valve body) is accommodated in the accommodation space S1 so as to closes the through hole 33. The valve body is a columnar member formed of an elastic member such as rubber. The valve body 30 includes a first end surface 30a that closes the through hole 33 on the inner wall surface 32b side of the bottom wall portion 32, a second end surface 30b opposite from the first end surface 30a, and the side surface 30c that connects the first end surface 30a and the second end surface 30b. The second end surface 30b is a surface to be pressed by the cover 31. The valve body 30 closes the through hole 33 with the first end surface 30a pressed against the inner wall surface 32b of the bottom wall portion 32. The valve body 30 opens and closes the through hole 33 depending on the pressure in the internal space V. A gap G is formed between the side surface 30c of the valve body 30 and the inner wall surface 37b of the partition wall portion 37, or the side surface 30c of the valve body 30 and the inner wall surface 36b of the outer peripheral wall portion 36.

As illustrated in FIGS. 5 and 7, a plurality of protruded portions 38 for positioning the valve body 30 are formed in the inner wall surface 37b of the partition wall portion 37. The protruded portions 38 protrudes radially inwardly from the inner wall surface 37b of the partition wall portion 37. That is, the protruded portion 38 protrudes towards the center of the accommodation space S1 from the inner wall surface 37b. The protruded portions 38 extend over the entire inner wall surface 37b of the partition wall portion 37 along the direction in which the central axis of the through hole 33 extends (X-axis direction). The protruded portions 38 are configured to be placed in contact with the side surface 30c of the valve body 30. With the protruded portions 38 placed in contact with the valve body 30, the central portion of the valve body 30 and the central axis of the through hole 33 may coincide with each other. The protruded portions 38 restrict the displacement of the valve body 30 within a certain range. In the present embodiment, a plurality of protruded portions 38 (six protruded portions 38 illustrated in the drawing) spaced at constant pitches around the central axis of the through hole 33 are formed in the inner wall surface 37b of each partition wall portion 37. In the illustrated example, the six protruded portions 38 including two protruded portions 38 formed on a line along the Z-axis passing through the center of the through hole 33 (i.e., the position of 6 o'clock and the position of 12 o'clock) are spaced at 60 degrees from each other as viewed from the X direction.

As illustrated in FIG. 7, a sealing portion 39 (projection) protruding outwardly from the inner wall surface 32b is formed in the inner wall surface 32b of the bottom wall portion 32 in the accommodation space S1. That is, the sealing portion 39 is surrounded by the partition wall portion 37 as viewed from the facing direction. Further, a plurality of sealing portions 39 are collectively surrounded by the outer peripheral wall portion 36. As described above, since one pressure control valve 12 is attached to the two mounting areas 24 in the configuration of the one example, the sealing portions 39 are disposed separately in one side and the other side of the center in the Y direction. The partition wall portions 37 surrounding the sealing portions 39 disposed on the one side of the center in the Y direction, and the partition wall portions 37 surrounding the sealing portions 39 disposed on the other side of the center in the Y direction are separated from each other at the center in the Y direction. Further, the plurality of through holes 33 are also disposed so that the through holes 33 formed lower than the center in the Z direction and the through holes 33 formed upper than the center in the Z direction are disposed alternately along the Y direction. Therefore, the sealing portions 39 disposed adjacently to each other in the Y direction are arranged at positions shifted from each other in the Z direction. Further, the partition wall portions 37 are arranged at positions shifted from each other in the Y direction (lateral direction). In one example, the distance between the axis of one of the partition wall portions 37 (a line extending in the X direction through the center of the through hole 33) and the axis of the other of the partition wall portions 37 of the two adjacently disposed partition wall portions 37 in the Y direction may be larger than the radius of the partition wall portion 37.

The sealing portion 39 is placed in contact with the first end surface 30a of the valve body 30 pressed against the sealing portion 39, so that a clearance between the through hole 33 and the gap G may be opened and closed by the sealing portion 39. The sealing portion 39 is formed so as to surround an open end of the through hole 33 at the inner wall surface 32b. The sealing portion 39 is formed in an annular shape extending along the edge portion of the through hole 33 around the central axis of the through hole 33. The sealing portion 39 is formed so as to surround the entire circumference of the through hole 33 without a gap. Accordingly, the sealing portion 39 is in contact with the first end surface 30a of the valve body 30 without a gap, thereby securing airtightness.

As illustrated in FIGS. 5 and 7, the case 29 has connecting wall portions 40 to which the edge portion of the cover 31 extending along a pair of notches 31a (which will be described later) formed in the cover 31 is welded (connected). In one example, the connecting wall portions 40 are formed on the opposite corners in a diagonal direction as viewed from the facing direction. The connecting wall portions 40 are integrally formed with the outer peripheral wall portion 36. End surfaces 40a of the connecting wall portions 40 on the cover 31 side are formed in the same plane with the end surface 36a of the outer peripheral wall portion 36.

The cover (lid) 31 is a plate-like member that closes the opening of the case 29. The cover 31 is made of a resin such as PP, PPS, or modified PPE. In one example, the cover 31 may be formed by injection molding. As illustrated in FIG. 8, the pair of notches 31a is formed in the cover 31, which corresponds to the connecting wall portions 40 of the case 29. A position of a portion of an outer peripheral edge portion of the cover 31 other than the edge portion along the notches 31a substantially coincides with a position of the outer peripheral edge portion of the case 29 (the outer edge portion of the outer peripheral wall portion 36), as viewed from the facing direction.

The cover 31 is connected to the open end surface of the case 29 by welding. Specifically, portions of the edge portion 42 of the cover 31 along the notches 31a are welded to the end surfaces 40a of the connecting wall portions 40, and a portion of the edge portion 42 other than the portion thereof along the notch 31a is welded to the end surface 36a of the outer peripheral wall portion 36. The edge portion 42 of the cover 31 is connected to the open end surface of the case 29 by, for example, ultrasonic welding.

The cover 31 has a discharge port 41 through which gas in the pressure control valve 12 is discharged to the outside of the pressure control valve 12. In the present embodiment, as an example, the discharge port 41 having a rectangular shape is provided at the center of the cover 31 in the Y direction. The discharge port 41 is disposed so as not to overlap the valve body 30 as viewed from the facing direction. The discharge port 41 is formed, for example, in a rectangular shape, as viewed from the facing direction.

The cover 31 has a flat inner surface 43 that presses the second end surface 30b of the valve body 30. Each valve body 30 is compressed by the inner surface 43 towards its associated sealing portion 39. In one example, the inner surface 43 of the cover 31 may correspond to an area surrounded by the edge portion 42 of the cover 31. The cover 31 has a reinforcing portion 50 for reinforcing the cover 31 in an outer surface 45 opposite from the inner surface 43. In one example, the cover 31 is made partially thick to form the reinforcing portion 50. In the illustrated example, it is illustrated that the reinforcing portion 50 includes a plurality of reinforcing portions 51 extending in the Z direction (the first direction) and a pair of reinforcing portions 52 extending in the Y direction (the second direction). Further, a reinforcing portion 53 is formed along each of the notches 31a in the illustrated example.

Figure 9:
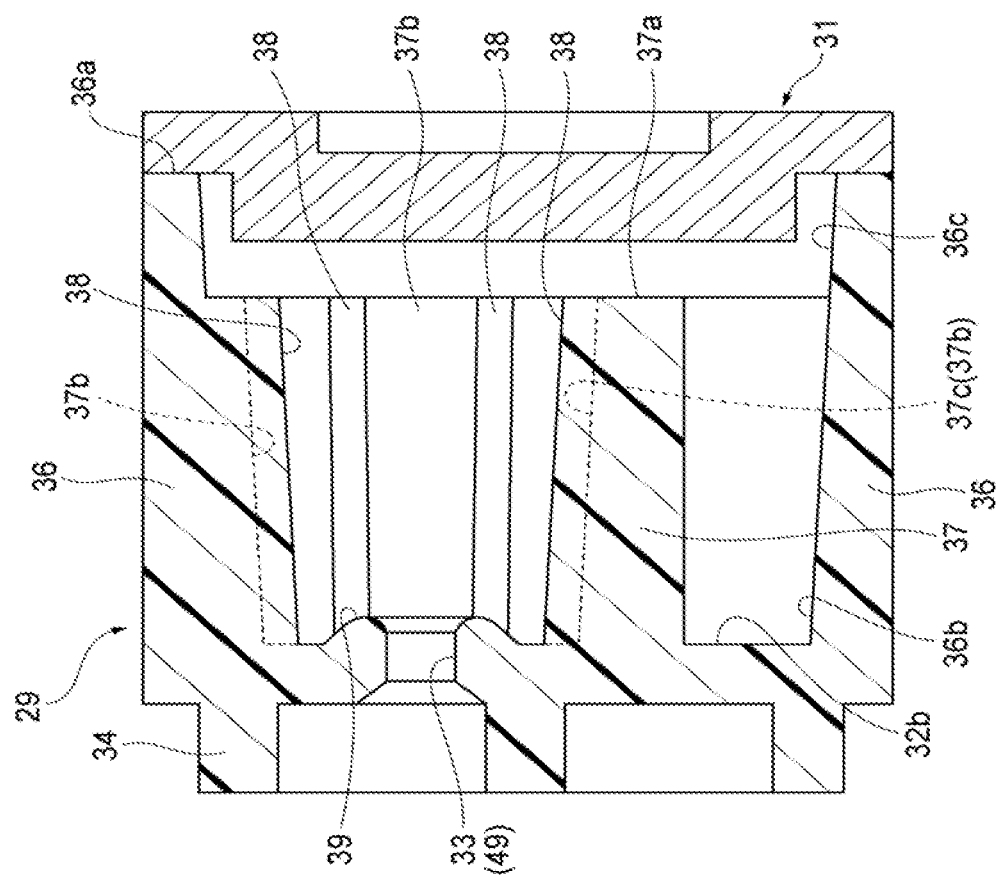
FIG. 9 is a schematic cross-sectional view illustrating a state where the case and the cover are assembled.
Figure 10:
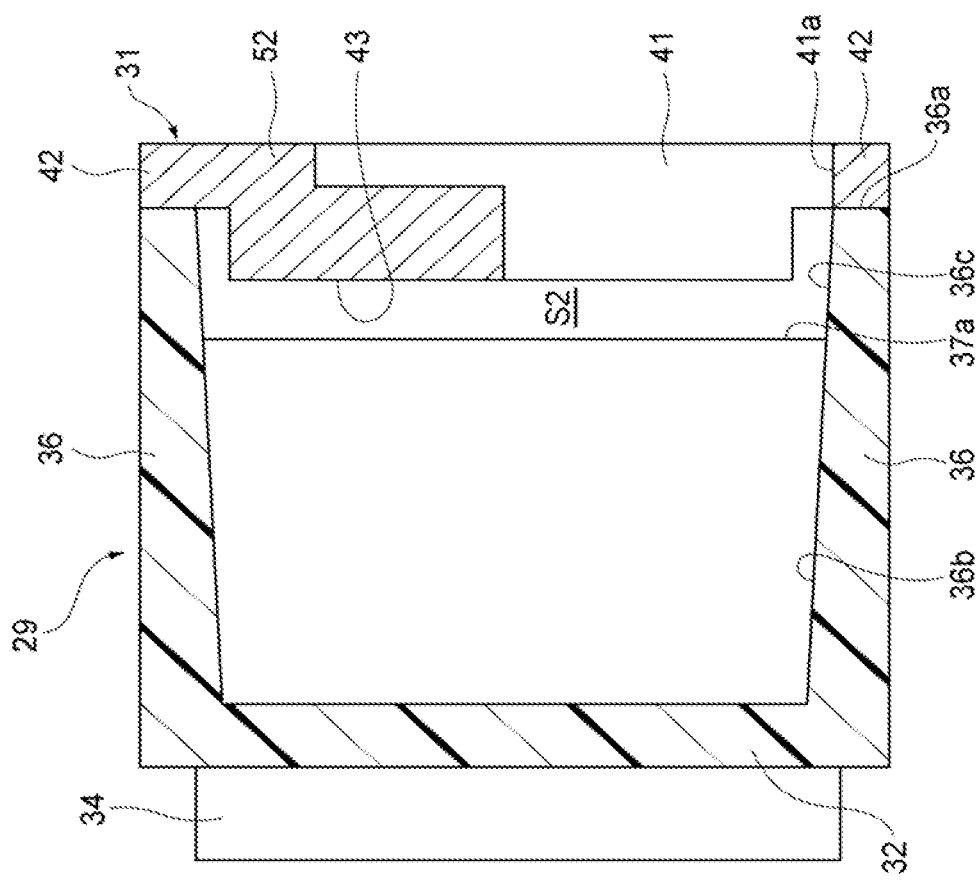
FIG. 10 is a schematic cross-sectional view illustrating a state where the case and the cover are assembled.

The following will further describe the configuration of the pressure control valve 12 with reference to FIGS. 9 and 10. FIG. 9 is a cross-sectional view illustrating a state where the case and the cover are assembled. FIG. 9 is a cross-sectional view taken along the position of the through hole formed above the center of the pressure control valve 12 in the Z direction. FIG. 10 is a cross-sectional view illustrating a state where the case and the cover are assembled. FIG. 10 is a cross-sectional view taken along the position of the exhaust port formed in the cover. In FIGS. 9 and 10, the valve body 30 is omitted.

As illustrated in FIG. 9, an inclined surface 37c is formed in the inner wall surface 37b of each of the partition wall portions 37, and the inclined surface 37c is inclined downwardly in the gravity direction (Z direction) from a proximal end to a distal end of the partition wall portion 37 with the inner wall surface 37b disposed horizontally along the compression direction (X direction) of the valve body 30. In one example, the inner wall surface 37b of the partition wall portion 37 has a reversed tapered shape, the diameter of which increases towards the distal end from the proximal end. As a result, in a state where the X direction and the Y direction are arranged on the same plane as illustrated, a portion of the surface of the inner wall surface 37b forming the lower side thereof forms the inclined surface 37c which is inclined downwardly in the gravity direction from the proximal end towards the distal end. Further, a surface of the inner wall surface 37b forming the upper side thereof is inclined upwardly from the proximal end to the distal end. In a state where the X-direction and the Y direction are arranged on the same plane, the angle of the inclined surface 37c relative to the horizontal surface is set at the angle that allows electrolyte discharged from the through hole 33 to flow towards the cover 31, for example, at about 0.1 degrees to 5 degrees.

As illustrated, the height of the protruded portion 38 from the inner wall surface 37b is constant from the proximal end to the distal end of the partition wall portion 37. Therefore, the protruded portions 38 formed in the inner wall surface 37b (six protruded portions illustrated in the drawing) are disposed so that the distance between the protruded portions 38 increases from the proximal end to the distal end of the partition wall portion 37. Further, in a state that the X direction and Y direction are arranged on the same plane, the protruded portion 38 disposed on the lower side (e.g., 6 o'clock position) is inclined downwardly towards the cover 31.

Further, a bottom surface 36c is formed in the inner wall surface 36b of the outer peripheral wall portion 36 between the end surface 37a of the partition wall portion 37 and the cover 31 in the compression direction. When the inclined surface 37c is disposed so that the inclined surface 37c is inclined downwardly in the gravity direction from the proximal end of the partition wall portion 37 to the distal end thereof, the bottom surface 36c is inclined downwardly in the gravity direction from the proximal end to the distal end (towards the cover 31). In the state where the X-direction and the Y direction are arranged at the same plane, the angle of the inclined surface 37c with respect to the horizontal surface is set at the angle that allows electrolyte discharged from the inside of the partition wall portion 37 to flow towards the cover 31, for example, at about 0.1 degrees to 5 degrees. In one example, the angle of the bottom surface 36c may be the same as the angle of the inclined surface 37c.

As illustrated in FIG. 10, the discharge port 41 formed in the cover 31 serves as an opening that provides communication between the space S2 surrounded by the outer peripheral wall portion 36 and the outside of the cover 31. In one example of the pressure control valve 12, the discharge port 41 serves as a discharge port for electrolyte discharged from the through hole 33, as well as for gas discharged from the through hole 33. When the inclined surface 37c is disposed so that the inclined surface 37c is inclined downwardly in the gravity direction from the proximal end of the partition wall portion 37 to the distal end thereof, the lower end surface 41a of the discharge port 41 is positioned at or lower than the position of the edge of the bottom surface 36c on the cover 31 side. In the illustrated example, the lower end surface 41a of the discharge port 41 extends along the Y direction, and is disposed on the same plane with the edge of the bottom surface 36c of the cover 31 side. The discharge port 41 may be formed, for example, in a formed of a notch.

According to the above-described structure of the pressure control valve 12, in each of the plurality of valve bodies 30, the first end surface 30a is placed in contact with the sealing portion 39 surrounding the through hole 33 (communication hole 49) with the second end surface 30b of the valve body 30 pressed by the cover 31. This places the first end surface 30a of the valve body and the sealing portion 39 in close contact so that the through hole 33 may be closed by its associated valve body 30. The through hole 33 of the case 29 communicates with the internal space V of the module main body 11 through the through hole 26 of the second sealing portion 23 and the through hole 25 of the first sealing portion 22. When the pressure in the internal space V is lower than a set pressure, a closed valve state where the through hole 33 is closed by the valve body 30 is maintained. When the pressure in the internal space V is greater than the set pressure, the valve body 30 is elastically deformed so as to be separated from the bottom wall portion 32, which results in a valve open state where the closing of the through hole 33 is released. As a result, gas from the internal space V flows to the space S2 formed between the partition wall portion 37 and the cover 31 through the gap G (accommodation space S1) between the side surface 30c of the valve body 30 and the inner wall surface 37b of the partition wall portion 37. Then, the gas is discharged from the space S2 to the outside of the pressure control valve 12 through the discharge port 41.

In adjusting the internal pressure of the module main body 11, the gas generated in the internal space V may be discharged to the accommodation space S1 of the partition wall portion 37 through the through hole 33 and the electrolyte in the internal space V may also be discharged to the accommodation space S1 through the through hole 33. In this case, if the electrolytes discharged from the two communication holes are in contact with each other, the electrodes may be short-circuited through the electrolytes when the two communication holes are in the open valve state simultaneously.

In the above-described pressure control valve structure, in a state where the stacking direction of the electrodes coincides with the vertical direction and the compression direction of the valve body 30 extends horizontally, the electrolyte discharged to the accommodation space S1 flows along the inclined surface 37c formed in the inner wall surface 37b of the partition wall portion 37 and is discharged to the outside of the accommodation space S1 through the gap between the partition wall portion 37 and the cover 31. This prevents the electrolyte from remaining in the accommodation space S1 to suppress the short circuit of the electrodes corresponding to the through holes 33 through the electrolytes.

Further, the accommodation space S1 has a substantially circular shape in cross section, and the inner wall surface 37b of the partition wall portion 37 is formed in a reverse tapered shape in which the diameter of the inner wall surface 37b increases from the proximal end to the distal end. According to this configuration, when the compression direction of the valve body 30 (X direction) is set extending horizontally, the lower surface of the inner wall surface 37b forms the inclined surface 37c. In this case, the inclined surface 37c is inclined downwardly towards the cover 31 even in a state where the Y direction of the pressure control valve 12 is not set extending horizontally.

Further, the partition wall portions 37 are arranged at positions shifted from each other in the Y direction. That is, the partition wall portions 37 are arranged so that the partition wall portions 37 are shifted from each other in the lateral direction as viewed from the compression direction when the inclined surface 37c is disposed so that the inclined surface 37c is inclined downwardly in the gravity direction from the proximal end of the partition wall portion 37 to the distal end of the partition wall portion 37. According to this configuration, two adjacently disposed partition wall portions 37 do not overlap each other in the vertical direction. That is, this configuration prevents the electrolyte from being discharged from the partition wall portion 37 located above the center in the Z direction to the partition wall portion 37 located below the center in the Z direction. Especially, in a case where of two adjacently disposed partition wall portions 37, the distance between the axis of one of the partition wall portions 37 and the axis of the other of the partition wall portions 37 in the Y direction is greater than the radius of the partition wall portion 37, the position of the bottom end of the upper partition wall portion 37 does not overlap the lower partition wall portion 37 in the Y direction. In this case, the electrolyte discharged from the upper partition wall portion 37 is likely to flow to the bottom surface 36c without flowing through the lower partition wall portion 37.

Further, the inner wall surface 36b of the outer peripheral wall portion 36 has the bottom surface 36c formed between the partition wall portion 37 and the cover 31 in the compression direction. According to this configuration, the electrolyte discharged from the gap between the partition wall portion 37 and the cover 31 to the bottom surface 36c may flow in a direction separating from the end surface 37a of the partition wall portion 37 along the inclination of the bottom surface 36c. Since the discharged electrolyte is easily separated from the end surface 37a, the connection between the different through holes 33 through the electrolytes is less likely to occur.

The discharge port 41 is formed in the cover 31 as an opening that provides communication between the space S2 surrounded by the outer peripheral wall portion 36 and the outside of the pressure control valve 12. When the inclined surface 37c is disposed so that the inclined surface 37c is inclined downwardly from the proximal end where the inclined surface 37c is connected to the inner wall surface 32b of the bottom wall portion 32 to the distal end, at least a part of the discharge port 41 is disposed at a position lower than the position of the through hole 33 formed at the lowest position. In one example, the position of the lower end surface 41a of the discharge port 41 is at or lower than the position of the edge of the bottom surface 36c of the outer peripheral wall portion 36 on the cover 31 side. According to the above-described configuration, the electrolyte discharged from the accommodation space S1 to the bottom surface 36c is prevent from remaining on the bottom surface 36c. That is, the electrolyte is easily discharged from the discharge port 41 to the outside.

Although the embodiment of the present disclosure has been described in detail with reference to the drawings, the configuration are not limited to this embodiment.

Although the configuration in which one pressure control valve 12 is provided for two mounting areas 24 has been described in one example, one pressure control valve may be provided for one mounting area. Alternatively, one pressure control valve 12 may be mounted to the four mounting areas.

Although the configuration in which the case 29 forming the pressure control valve 12 is mounted to the frame 16 of the module main body 11 has been described, for example, the frame of the module main body and the case of the pressure control valve may be formed integrally by injection molding.

The shape of the accommodation space S1 in which the valve body 30 is accommodated is not limited to a substantially circular shape in cross section, but may be a polygonal shape such as a tetragon and a hexagon.

Although an example of the configuration in which the position of the lower end surface 41a of the discharge port 41 is positioned at or lower than the position of the edge of the bottom surface 36c of the outer peripheral wall portion 36 on the cover 31 side has be described, the position of the lower end surface 41a of the discharge port 41 may be positioned higher than the position of the edge of the bottom surface 36c of the outer peripheral wall portion 36 on the cover 31 side.

What is claimed is:

1. A pressure control valve structure used for a power storage module including a plurality of cells each having an internal space in which a positive electrode, a negative electrode, a separator, and an electrolyte are accommodated, the pressure control valve structure comprising:
    a wall portion having a plurality of communication holes, the plurality of communication holes corresponding to the plurality of cells, respectively, each of the plurality of communication holes communicating with the internal space;
    a plurality of tubular portions surrounding their associated communication holes and protruding outwardly from a wall surface of the wall portion as proximal ends;
    a plurality of elastic valve bodies, each of the plurality of elastic valve bodies accommodated in each of the plurality of tubular portions and having a first end surface and a second surface opposite from the first end surface, the first end surface closing each of the plurality of communication holes;
    an outer peripheral wall surrounding the plurality of tubular portions collectively; and
    a cover fixed to the outer peripheral wall and pressing the second end surface of each of the plurality of elastic valve bodies towards the wall portion, wherein
    the plurality of tubular portions are spaced from the cover, and
    the plurality of tubular portions have inner wall surfaces, respectively, and inclined surfaces are formed in surfaces of the inner wall surfaces forming lower parts of the inner wall surfaces and inclined downwardly in a gravity direction from the proximal ends of the plurality of tubular portions to distal ends of the plurality of tubular portions with a compression direction of the plurality of elastic valve bodies set extending horizontally.

2. The pressure control valve structure according to claim 1, wherein
    the plurality of tubular portions each have a circular shape in cross section as viewed from the compression direction, and
    the inner wall surfaces of the plurality of tubular portions are formed so that diameters of the inner wall surfaces increase from the proximal ends of the plurality of tubular portions to the distal ends of the plurality of tubular portions.

3. The pressure control valve structure according to claim 1, wherein
    the inner wall surfaces of the plurality of tubular portions are disposed at positions shifted from each other in a lateral direction as viewed from the compression direction when the inclined surfaces are disposed so that the inclined surfaces are inclined downwardly in the gravity direction from the proximal ends of the plurality of tubular portions to the distal ends of the plurality of tubular portions.

4. The pressure control valve structure according to claim 1, wherein
a bottom surface is formed in an inner wall surface of the outer peripheral wall between the plurality of tubular portions and the cover, the bottom surface being inclined downwardly in the gravity direction towards the cover when the inclined surfaces are disposed so that the inclined surfaces are inclined downwardly in the gravity direction from the proximal ends of the plurality of tubular portions to the distal ends of the plurality of tubular portions.

5. A power storage module comprising;
the pressure control valve structure according to claim 1.

6. A pressure control valve structure used for a power storage module including a plurality of cells each having an internal space in which a positive electrode, a negative electrode, a separator, and an electrolyte are accommodated, the pressure control valve structure comprising:
a wall portion having a plurality of communication holes, the plurality of communication holes corresponding to the plurality of cells, respectively, each of the plurality of communication holes communicating with the internal space;
a plurality of tubular portions surrounding their associated communication holes and protruding outwardly from a wall surface of the wall portion as proximal ends;
a plurality of elastic valve bodies, each of the plurality of elastic valve bodies accommodated in each of the plurality of tubular portions and having a first end surface and a second surface opposite from the first end surface, the first end surface closing each of the plurality of communication holes;
an outer peripheral wall surrounding the plurality of tubular portions collectively; and
a cover fixed to the outer peripheral wall and pressing the second end surface of each of the plurality of elastic valve bodies towards the wall portion, wherein
the plurality of tubular portions are spaced from the cover,
the plurality of tubular portions have inner wall surfaces, respectively, that include inclined surfaces that are inclined downwardly in a gravity direction from the proximal ends of the plurality of tubular portions to distal ends of the plurality of tubular portions with a compression direction of the plurality of elastic valve bodies set extending horizontally,
a bottom surface is formed in an inner wall surface of the outer peripheral wall between the plurality of tubular portions and the cover, the bottom surface being inclined downwardly in the gravity direction towards the cover when the inclined surfaces are disposed so that the inclined surfaces are inclined downwardly in the gravity direction from the proximal ends of the plurality of tubular portions to the distal ends of the plurality of tubular portions,
the cover has an opening that provides communication between a space surrounded by the outer peripheral wall and an outside of the pressure control valve structure, and
at least a part of the opening is formed at a position lower than the position of the plurality of communication holes when the inclined surfaces are disposed so that the inclined surfaces are inclined downwardly in the gravity direction from the proximal ends of the plurality of tubular portions to the distal ends of the plurality of tubular portions.

* * * * *